UNITED STATES PATENT OFFICE.

GEORGE W. CHIPMAN, OF BOSTON, MASSACHUSETTS.

IMPROVEMENT IN PROCESSES OF TREATING COTTON AND OTHER FIBROUS SUBSTANCES FOR PROTECTION AGAINST MOTHS.

Specification forming part of Letters Patent No. 156,879, dated November 17, 1874; application filed August 1, 1874.

*To all whom it may concern:*

Be it known that I, GEORGE W. CHIPMAN, of Boston, in the county of Suffolk and State of Massachusetts, have invented certain new and useful Improvements in Process of Treating Cotton and other Fibrous Substances for Protection against Moths; and I do hereby declare the following to be a full, clear, and exact description of the invention, such as will enable others skilled in the art to which it pertains to make and use it.

My invention relates to an improvement in materials for the lining of carpets or other fabrics; or, for the packing of any goods liable to destruction from moth; and is intended to act as a prevention of said destruction by moth; and it consists in odorating and impregnating cotton or other fibrous material with a decoction of red cedar, and treating it with solution of sulphate of zinc to protect it from mildew.

The cotton or other fibrous material is prepared by immersing in a decoction of red cedar, with aluminous or iron mordants, whereby the desired properties of the cedar are imparted to and fixed in the said cotton or fibrous material.

As a protection from decomposition or mildew, which would be apt to occur from exposure to wet or dampness, the cedrinated cotton or fibrous material, as above described, may be treated with a dilute solution of sulphate of zinc.

I am aware that cedar sawdust has before been employed as a protection against moths in the construction of mattresses, &c., the cedar sawdust being sprinkled among the hair or other material of the mattress. This, therefore, I do not claim; but What I do claim as my invention, and desire to secure by Letters Patent, is—

The process of preparing cotton or other fibrous material, for the purposes substantially as set forth, consisting in impregnating the same with a decoction of red cedar.

In testimony that I claim the foregoing I have hereunto set my hand this 31st day of July, 1874.

GEORGE W. CHIPMAN.

Witnesses:
    LEVERETT L. LEGGETT,
    J. TYLER POWELL.